United States Patent Office 3,113,674
Patented Dec. 10, 1963

3,113,674
COMPOSITION COMPRISING SODIUM CELLULOSE ACETATE SULFATE AND A POLYMER AND UNIT PACKAGE PREPARED THEREFROM
John E. Kiefer and George P. Touey, Kingsport, Tenn., assignors to Eastman Kodak Company, Rochester, N.Y., a corporation of New Jersey
No Drawing. Filed Aug. 28, 1961, Ser. No. 134,097
11 Claims. (Cl. 206—84)

This invention relates to film, and particularly to water-soluble, heat-sealable film for use as a packaging material.

Considerable interest has been evidenced recently in the use of water-soluble film for packaging predetermined amounts of household products such as dyes, bleaches, soaps, detergents, and the like to provide unit packages of these household products. The use of unit packages of this type eliminates weighing and handling the household products by the ultimate consumer. Thus, for example, a unit package, prepared from a water-soluble material, and containing a predetermined amount of detergent is placed into a washing machine at the start of the washing cycle; the water-soluble packaging material dissolves in the wash water, and the detergent is thus released into the wash water to perform its intended function.

Various water-soluble films have been proposed for use in preparing unit packages of household products; however, the proposed films have not proved entirely satisfactory.

Film prepared from poly(vinyl alcohol) has been proposed for this purpose; however, from the standpoint of processing such film into unit packages, it has not proved entirely satisfactory. The main drawback of poly(vinyl alcohol) film is the fact that it has a low modulus of elasticity and a low yield strength. As a result, the film is easily distorted when placed under tension and this is a serious disadvantage in preparing unit packages. To produce unit packages of various household products economically, it is necessary that they be produced on high-speed packaging apparatus. The high-speed apparatus subjects the film to a series of stress conditions and the like which tend to distort the film, rendering it unsatisfactory for unit packaging purposes.

Further, in the use of high-speed packaging apparatus, it is desirable to splice together several separate rolls of film for continuous passage through the apparatus in order to eliminate shut down time usually required to position a second roll of film on the apparatus for processing. It is extremely difficult to establish and maintain a satisfactory splice between two sheets of poly(vinyl alcohol) film.

An object of this invention is the production of water-soluble, heat-sealable films that have good tear resistance, high modulus of elasticity, high yield strength, and good flexibility.

Another object of this invention is to provide a water-soluble, heat-sealable film for use in preparing unit packages of detergents, soaps, bleaches, and the like household products, which film is capable of withstanding the abuse to which it is subjected on high speed packaging machines, has good resistance to tear and good flexibility properties.

Another object of this invention is to provide a unit package prepared from the novel water-soluble, heat-sealable film of this invention.

Other objects of this invention will, in part, be obvious, and will, in part appear hereinafter.

For a complete understanding of the nature and the objects of this invention, reference is made to the following detailed description.

In accordance with this invention there is prepared water-soluble film for use in preparing unit packages of such household products as detergents, bleaches, soaps, dyes, and mixtures of two or more. Film prepared in accordance with this invention has a high modulus of elasticity, high yield strength, good resistance to tear, good flexibility properties, and can be easily and readily sealed together by the application of heat. The film of this invention is capable of withstanding the abuse to which it is subjected when being fabricated into unit packages on high speed packaging and processing equipment.

The novel film of this invention has good water-solubility characteristics and highly satisfactory heat-sealing properties, and is comprised of (1) a specific sodium cellulose acetate sulfate and (2) a compound selected from the group consisting of (a) poly(vinyl alcohol) and (b) poly(ethylene glycol) having an average molecular weight of about 50,000 and higher.

In preparing the novel film of this invention, different procedures will be employed, depending upon whether the film product is to be comprised of sodium cellulose acetate sulfate and poly(vinyl alcohol), or whether the film is to be comprised of sodium cellulose acetate sulfate and the specific poly(ethylene glycol). The method of preparing these films will be detailed more fully hereinafter.

The sodium cellulose acetate sulfate employed in preparing the novel film of this invention is a thermoplastic resinous material and will contain from about 0.3 to 1.0 sulfate group for each $C_6$ unit in the compound structure. This corresponds to a sulfur content of from about 3.5% to 10% based on the weight of the dry sodium cellulose acetate sulfate. The acetyl content of the sodium cellulose acetate sulfate will be from about 1.5 to 2.6 acetyl groups per each $C_6$ unit in the compound structure. This corresponds to an acetyl content of from about 18% to 38%. Sodium cellulose acetate sulfates having the above characteristics are well known in the art, and can be prepared in accordance with the teachings of Patents 2,582,009 and 2,622,079, reference to which is hereby made.

Thus, for example, sodium cellulose acetate sulfate can be prepared by esterifying cellulose with a mixture of acetic anhydride and a considerable proportion of sulfuric acid, and by controlling the reaction so that the temperature of the reaction mass is never allowed to exceed about 85° F. Thereupon, the sodium salt of a weak acid, such as sodium acetate, is introduced into the mixture reaction mass to form the sodium salt of the cellulose acetate sulfate which was formed in the reaction.

The following specific example is illustrative of a method of preparing sodium cellulose acetate sulfate for use in this invention. All parts are by weight unless otherwise specified.

EXAMPLE I

About 300 parts of undried cotton linters are placed into a jacketed sigma blade type mixed together with about 720 parts of glacial acetic acid and mixed for about 1 hour to about 96° F. maximum temperature. A mixture of about 475 parts of glacial acetic acid and 2.21 parts of concentrated sulfuric acid are then added to the mixer and the resulting mixture is cooled to about 65° F. in about 10 minutes. About 85 parts of 97% acetic anhydride are then added to this mixture and it is allowed to cool for about 15 minutes. About 150 parts of anhydrous sodium acetate are added to the ingredients in the mixer and the resulting mass is mixed for about 5 minutes while cold water is circulated in the jacket of the mixer. About 720 parts of 97% acetic anhydride are mixed with about 600 parts of glacial acetic acid and this mass is cooled to below about 40° F. To this mixture, a mixture of 218.6 parts of concentrated sulfuric acid and 150 parts of glacial acetic acid is added at a rate sufficient so that the temperature of the mass does not exceed about 40° F. The solution is then cooled to about 16° F. and added to the mass in the mixer over a period of about 30 minutes. The reaction temperature is allowed to rise from 50° F. to 55° F. during this period of addition and then to 70° F. over the next 2 hours, and mixing is continued for an additional 4½ hours while the temperature of 70° F. is maintained. About 600 parts of glacial acetic are then added to the mass in the mixer over a period of about 30 minutes. The resulting mass is centrifuged so as to be as free of acid as possible and then washed in isopropanol until a sample of the product, dissolved in water, has a pH of about 3.9. A white fibrous product is obtained which is then slurried in 10 parts of 99% isopropanol and an aqueous solution of sodium carbonate is added until the pH of a test sample, dissolved in distilled water, is from about 6 to 7. The product is then centrifuged and subsequently dried in an oven maintained at a temperature of about 140° F. The resulting product has a sulfur content of about 8.6% and an acetyl content of about 23.2%.

The poly(vinyl alcohol) employed in carrying out this invention can be unsubstituted, or can be one in which the hydroxyl groups have been substituted to a certain degree with acetyl and/or ether groups provided the so substituted poly(vinyl alcohol) is water soluble. Water-soluble poly(vinyl alcohol) is well known in the art and is available commercially.

The poly(ethylene glycol) employed in this invention can be any of those that possess film-forming properties. A poly(ethylene glycol) of this type will have an average molecular weight of about 50,000 and higher. A poly(ethylene glycol) having an average molecular weight of from about 50,000 to 500,000 can be employed satisfactorily in carrying out this invention. Poly(ethylene glycol) is also referred to in the art as poly(oxyethylene glycol). These compounds can be prepared by the reaction of ethylene oxide and ethylene glycol in the presence of an alkaline catalyst, and with a degree of addition of the ethylene oxide controlled to produce a polymer of desired molecular weight. Other methods of preparing a poly(ethylene glycol) are well known in the art. A particularly suitable poly(ethylene glycol) for use in this invention is that available commercially under the proprietary designation Polyox WSR–35.

When poly(ethylene glycol) is employed in admixture with sodium cellulose acetate sulfate to prepare the novel water-soluble, heat-sealable films of this invention, from about 20 to 80 parts by weight of the poly(ethylene glycol) and from 80 to 20 parts by weight of the sodium cellulose acetate sulfate can be employed satisfactorily. Particularly satisfactory results are obtained when from about 30 to 70 parts by weight of poly(ethylene glycol) and from about 70 to 30 parts by weight of sodium cellulose acetate sulfate are employed in preparing the novel water-soluble, heat-sealable film of this invention.

When the above mixture of poly(ethylene glycol) and sodium cellulose acetate sulfate is employed to prepare the novel films of this invention, the mixture can be melted by heating to a temperature from about 120° C. to about 140° C. with constant stirring to provide a substantially uniform homogeneous fused mass. The fused mass is melt extruded, cast, or otherwise formed into relatively thin sheets or films of desired thickness, usually of the order of from about 0.5 mil to 5 mils.

When the novel water-soluble, heat-sealable film of this invention is prepared from a composition comprising poly(vinyl alcohol) and sodium cellulose acetate sulfate, the amount of sodium cellulose sulfate employed can be varied from about 50 parts to 10 parts by weight and the amount of poly(vinyl alcohol) employed can be varied from about 50 parts to about 90 parts by weight. However, it has been determined that the more desirable proportions are from about 60 parts to 80 parts by weight of poly(vinyl alcohol) and from about 40 parts to 20 parts by weight of sodium cellulose acetate sulfate.

When admixtures of poly(vinyl alcohol) and sodium cellulose acetate sulfate are employed to prepare the novel water-soluble, heat-sealable films of this invention, it is necessary to prepare an aqueous solution thereof prior to preparing films comprising these two compounds. The aqueous solution of the two components is thoroughly admixed and the composition is formed into thin film by casting on a suitable surface, such, for example, as glass; the water removed therefrom, and the resulting film stripped from the glass surface.

Water-soluble plasticizers can be added to the compositions of this invention to improve to some extent the flexibility of the films prepared therefrom. The amount of plasticizer employed will usually be from about 5% to 30% by weight based on the total weight of the solid resinous components comprising the composition.

Examples of suitable plasticizers include polyethylene glycols of low molecular weight, diethylene glycol, triethylene glycol, glycerol, glycerol monoacetate, butylene glycol, hexylene glycol, hydroxyethylated formamide, and acetamide. Particularly suitable plasticizers include polyethylene glycols having an average molecular weight of from about 300 to 600, and 1,2,6-hexanetriol.

The following examples are illustrative of this invention. All parts are by weight unless otherwise indicated.

EXAMPLE II

Poly(vinyl alcohol), having a viscosity of about 20 centipoises in a 4 percent aqueous solution at about 20° C., is dissolved in hot water to provide an aqueous solution comprising 20 percent by weight, based on the total weight of the aqueous solution, of the poly(vinyl alcohol). This solution is allowed to stand until it cools to room temperature (about 25° C.), and there is provided a viscous, smooth mass. A 20 percent aqueous solution of sodium cellulose acetate sulfate having a sulfur content of about 8.8 percent and an acetyl content of about 22 percent is prepared in a similar manner.

A series of mixtures of the two solutions, comprised of different proportions of the two resinous components, are prepared and the resulting mixtures are cast into films on glass plates by means of a doctor blade adjusted so that the thickness of the film, after drying, is from about 1.5 mils to about 2.0 mils. The composition of the several films prepared in this manner are set forth in Table A below. After the water is removed from the cast films by evaporation, the resulting films are stripped from the glass plate. The physical properties of the films thus prepared are set forth in Table A below.

Table A

| Composition of Film, Parts by Weight | | Et,[1] p.s.i.×10⁵ | Yield Strength [2] (p.s.i.) | Tear Strength [3] (p.s.i.) |
|---|---|---|---|---|
| Poly (vinyl alcohol) | Sodium Cellulose Acetate Sulfate | | | |
| 50 | 50 | 1.37 | 1,780 | 410 |
| 60 | 40 | 1.19 | 1,590 | 590 |
| 70 | 30 | 0.97 | 1,410 | 610 |
| 80 | 20 | 0.81 | 1,270 | 670 |
| 90 | 10 | 0.60 | 1,040 | 690 |

[1] Modulus of elasticity as described in ASTM D882–56T Method A.
[2] Determined by the 2 percent offset method as defined in ASTM D638–58T.
[3] Determined by ASTM D689–44.

EXAMPLE III

Twenty parts of partially hydroxyethylated poly(vinyl alcohol) are dissolved in about 80 parts of water. A solution of plasticized sodium cellulose acetate sulfate is prepared by dissolving 20 parts of sodium cellulose acetate sulfate similar to that employed in Example II above and 6 parts of glycerine (plasticizer) in 74 parts of water. A series of mixtures of the two solutions having different compositions are prepared. The thus-prepared mixtures are cast into films on glass plates in a manner similar to that described in Example II above and subsequently stripped therefrom. The compositions and physical properties of the films thus prepared are set forth in Table B below. The physical properties are measured by the same test procedures used in Example II.

*Table B*

| Composition of Film Parts by Weight | | Et, p.s.i.×10⁵ | Yield Strength (p.s.i.) | Tear Strength (p.s.i.) |
|---|---|---|---|---|
| Poly(vinyl alcohol) | Sodium Cellulose Acetate Sulfate | | | |
| 90 | 10 | 0.38 | 910 | 1,150 |
| 80 | 20 | 0.45 | 1,170 | 1,110 |
| 70 | 30 | 0.56 | 1,310 | 1,030 |
| 60 | 40 | 0.63 | 1,410 | 940 |
| 50 | 50 | 0.76 | 1,600 | 720 |

EXAMPLE IV

A series of blends of granulated poly(ethylene glycol) having an average molecular weight of about 50,000 (available commercially under the proprietary name of Polyox WSR-35), and granulated sodium cellulose acetate sulfate having a sulfur content of about 7.2% and an acetyl content of about 22 percent are prepared. The sodium cellulose acetate sulfate is prepared by the method described in Patent 2,622,079 referred to hereinabove. The composition of the several blends prepared are set forth in Table C below. The several blends are prepared separately by tumbling, in a closed container, the desired amount of poly(ethylene glycol) and sodium cellulose acetate sulfate to provide an intimate admixture. The admixture is then placed on a two-roll calender mill and rolled at a temperature of about 130° C. until a substantially uniform homogeneous melt is obtained. The melt is subsequently stripped from the rolls, cooled to room temperature and granulated. The granulated mass prepared from each separate blend of the poly(ethylene glycol) and the sodium cellulose acetate sulfate is fed into a heated extruder wherein the granular mass is heated and extruded at a temperature of about 130° C. through a die having a rectangular cross-section of 2 inches by about 0.005 inch. The extruded film is pulled away from the face of the die by means of a rotating casting roll. The thickness of film prepared in this manner is highly dependent upon the linear speed of the surface of the casting rolls. The speed of the casting roll in this example is adjusted so that the resulting film has a thickness of about 2 mils. The composition and several properties of the films prepared from the several individual blends are set forth in Table C below. The properties are measured in accordance with the test procedures employed in Example II.

*Table C*

| Composition of Film Parts by Weight | | Et, p.s.i.×10⁵ | Yield Strength (p.s.i.) | Tear Strength (p.s.i.) |
|---|---|---|---|---|
| poly(ethylene glycol) | Sodium Cellulose Acetate Sulfate | | | |
| 80 | 20 | 0.52 | 790 | 560 |
| 60 | 40 | 0.91 | 1,430 | 480 |
| 40 | 60 | 1.24 | 1,980 | 310 |
| 20 | 80 | 1.44 | 2,540 | 90 |

EXAMPLE V

Two sheets of film, each 4 inches square, are prepared and heat sealed together along three edges thereof to provide an envelope with an opening in one end thereof. The envelope is filled with a detergent and the open end thereof heat sealed to provide a unit package of the detergent. The film employed in this example is prepared in accordance with Example III and is comprised of, by weight, about 60 parts of poly(vinyl alcohol) and 40 parts of sodium cellulose acetate sulfate. The unit package is placed in a container containing water maintained at a temperature of about 160° F. The packaging film readily dissolves in the hot water and releases the detergent into the water.

Films prepared in accordance with this invention are highly satisfactory for use in packaging predetermined amounts of such household products as detergents, bleaches, dyes and the like to provide unit packages thereof. When used for such purposes the film will have a thickness usually of the order of from about 0.5 mil to 5 mils. Thicker films or sheets can be prepared if desired. The films are readily soluble in warm water and have good heat-sealing properties. The films have good resistance to tear and are not easily distorted where subjected to conditions of stress and the like. The films of this invention can be satisfactorily employed on high speed packaging equipment and machinery. Further, the films of this invention can be spliced together satisfactorily.

It is to be understood that the above description and examples are illustrative of this invention and not a limitation thereof.

We claim:
1. A composition of matter comprising
   (1) sodium cellulose acetate sulfate having from about 0.3 to 1.0 sulfate group for each $C_6$ unit in the compound structure and from about 1.5 to 2.6 acetyl groups for each $C_6$ unit in the compounds structure, and
   (2) a compound selected from the group consisting of, by weight,
      (a) from about 50 parts to 90 parts of poly(vinyl alcohol), and
      (b) from about 20 parts to 80 parts of poly(ethylene glycol) having an average molecular weight of from about 50,000 to 500,000,
   the amount of sodium cellulose acetate sulfate being from about 50 parts to 10 parts by weight when compound (2) is (a) and from about 80 parts to 20 parts by weight when compound (2) is (b).
2. A composition of matter comprising, by weight,
   (1) from about 20 parts to 80 parts of sodium cellulose acetate sulfate having from about 0.3 to 1.0 sulfate group for each $C_6$ unit in the compound structure and from about 1.5 to 2.6 acetyl groups for each $C_6$ unit in the compound structure, and
   (2) from about 80 parts to 20 parts of poly(ethylene glycol) having an average molecular weight of from about 50,000 to 500,000.
3. A composition of matter comprising, by weight,
   (1) from about 10 parts to 50 parts of sodium cellulose acetate sulfate having from about 0.3 to 1.0 sulfate group for each $C_6$ unit in the compound structure and from about 1.5 to 2.6 acetyl groups for each $C_6$ unit in the compound structure, and
   (2) from about 90 parts to 50 parts of poly(vinyl alcohol).
4. A water-soluble, heat-sealable film comprised of
   (1) sodium cellulose acetate sulfate having from about 0.3 to 1.0 sulfate group for each $C_6$ unit in the compound structure and from about 1.5 to 2.6 acetyl groups for each $C_6$ unit in the compound structure, and

(2) a compound selected from the group consisting of, by weight.
    (a) from about 50 parts to 90 parts of poly(vinyl alcohol), and
    (b) from about 20 parts to 80 parts of poly(ethylene glycol) having an average molecular weight of from about 50,000 to 500,000.
the amount of sodium cellulose acetate sulfate being from about 50 parts to 10 parts by weight when compound (2) is (a) and from about 80 parts to 20 parts by weight when compound (2) is (b).

5. A water-soluble, heat-sealable film comprised of, by weight,
    (1) from about 20 parts to 80 parts of sodium cellulose acetate sulfate having from about 0.3 to 1.0 sulfate group for each $C_6$ unit in the compound structure and from about 1.5 to 2.6 acetyl groups for each $C_6$ unit in the compound structure, and
    (2) from about 80 parts to 20 parts of poly(ethylene glycol) having an average molecular weight of from about 50,000 to 500,000.

6. A water-soluble, heat-sealable film comprised of, by weight,
    (1) from about 10 parts to 50 parts of sodium cellulose acetate sulfate having from about 0.3 to 1.0 sulfate group for each $C_6$ unit in the compound structure and from about 1.5 to 2.6 acetyl groups for each $C_6$ unit in the compound structure, and
    (2) from about 90 parts to 50 parts of poly(vinyl alcohol).

7. A unit package comprising a water-soluble, heat-sealable film, said film being the film of claim 4.

8. A unit package comprising a water-soluble, heat-sealable film, said film being the film of claim 5.

9. A unit package comprising a water-soluble, heat-sealable film, said film being the film of claim 6.

10. A unit package comprising a compound selected from the group consisting of bleaches, dyes, detergents, soaps, and mixtures thereof packaged within a sealed envelope comprised of a water-soluble film, said film being the film of claim 6.

11. A unit package comprising a compound selected from the group consisting of bleaches, dyes, detergents, soaps, and mixtures thereof packaged within a sealed envelope comprised of a water-soluble film, said film being the film of claim 5.

References Cited in the file of this patent

UNITED STATES PATENTS

| | | |
|---|---|---|
| 1,975,959 | Lawson et al. | Oct. 9, 1934 |
| 2,622,079 | Crane | Dec. 16, 1952 |

FOREIGN PATENTS

| | | |
|---|---|---|
| 1,053,739 | Germany | Mar. 26, 1959 |

OTHER REFERENCES

Du Pont, "Elvanol," Uses of "Elvanol," film, 1947, pages 17, 252–93.